United States Patent [19]
Hendershot et al.

[11] Patent Number: 5,117,677
[45] Date of Patent: Jun. 2, 1992

[54] TWO-STAGE VACUUM MONITORING AND LEAK DETECTION SYSTEM FOR LIQUID PRODUCT CONTAINMENT FACILITIES

[75] Inventors: John A. Hendershot; Randall S. Click, both of Shawnee, Okla.

[73] Assignee: J.A.A.M. Revocable Trust, Shawnee, Okla.

[21] Appl. No.: 568,764

[22] Filed: Aug. 17, 1990

[51] Int. Cl.$^5$ ............................................. G01M 3/32
[52] U.S. Cl. ...................................... 73/49.2; 340/605
[58] Field of Search .................... 73/49.2 T; 340/605; 220/469, 565, 420

[56] References Cited

U.S. PATENT DOCUMENTS 4,796,676  1/1989  Hendershot et al. ................. 141/83

FOREIGN PATENT DOCUMENTS

2161564  6/1973  Fed. Rep. of Germany ....... 73/49.2
2352544  4/1975  Fed. Rep. of Germany ....... 73/49.2
2433818  1/1976  Fed. Rep. of Germany ....... 73/49.2
2735804  2/1979  Fed. Rep. of Germany ....... 73/49.2

*Primary Examiner*—Hezron E. Williams
*Assistant Examiner*—Joseph W. Roskos
*Attorney, Agent, or Firm*—Laney, Dougherty, Hessin & Beavers

[57] ABSTRACT

A leak detection system for monitoring an evacuated space which includes a vacuum pump, a low vacuum gauge for continuously monitoring the magnitude of the vacuum in said space, and a vacuum control switching assembly responsive to the vacuum in the space for periodically starting the pump when the vacuum in the space is lost to a predetermined extent, and thereby restoring the vacuum to a certain magnitude. A counter is provided to count cycles of the vacuum pump. An alarm device provides an alarm responsive to excecssive running of the pump. A high vacuum test line is connected between the evacuated space and the vacuum pump. The high vacuum test line and vacuum pump are used concurrently with a switching system which opens to allow atmospheric air to be drawn into the evacuated space between the confining walls to sweep out and purge this space when high vacuum is applied to the evacuated space, and which isolates the sensitive low vacuum gauge at this time.

16 Claims, 4 Drawing Sheets

TWO-STAGE VACUUM MONITORING AND LEAK DETECTION SYSTEM FOR LIQUID PRODUCT CONTAINMENT FACILITIES

FIELD OF THE INVENTION

This invention relates to a system for continuously monitoring and periodically restoring a selected negative air pressure in the interstices between the walls of a double-walled liquid containment system, and for periodically testing the integrity of each of the walls, while purging and cleaning the interstices.

BACKGROUND OF THE INVENTION

1. Brief Description Of The Prior Art

Mounting concerns for all forms of environmental pollution have resulted in governmental requirements that liquids stored in tanks be safeguarded against undesirable leakage to the surroundings. It is widely required by U.S. federal and state legislation that double containment systems be provided for almost all liquids which are incompatible with ground water, or damaging to vegetation, and particularly in the case of underground liquid storage tanks. The latter category includes thousands of previously buried gasoline and diesel storage tanks which have been in the ground for many years, and are often in an advanced stage of deterioration. These tanks must either be replaced with new, double-walled tanks, or converted to an effective double-containment system. The former alternative often poses prohibitive expense, with the result that, unless an effective in-situ conversion can be accomplished, the small business depending upon the underground liquid storage tank, such as an automobile service station, frequently cannot continue to operate.

As indicated, the required environmental safeguards against environmental pollution from subterranean liquid storage have generally required the use of some form of double-walled tank or container—a form of redundancy which alone, of course, would theoretically merely require twice as long for the undesirable pollution to occur. In recognition of this, widespread efforts have gone forward, and in some cases have been required by certain regulations, to provide a system for monitoring the integrity of the containment system, and for testing the two walls for leakage or failure. In this way, at worst, a forewarning of imminent environmental pollution is had, and at best, measures may be taken to repair leaks in the system, or otherwise restore its liquid containment integrity.

One type of containment system which has heretofore been proposed is the double-walled containment system described in Hendershot et al U.S. Pat. No. 4,796,676 and Hendershot et al pending U.S. patent application Ser. No. 429,073, assigned to World Enviro Systems, Inc. These patents advocate the placement inside of a steel or Fiberglas ® outer tank, which in most cases will be an existing single wall tank, of a flexible, internal liner or tank which actually contains the liquid to be stored in the double-walled tank system. This flexible liner or internal tank is configured to fit closely against the internal wall of the external tank, and may be forced into this position of lining the external tank by the use of internal air pressure and/or by use of an evacuation of the interstices existent between the external wall of the internal tank or liner, and the internal wall of the external tank.

The described system, using a rigid external tank of Fiberglas ® or steel, and an internal flexible tank or liner, affords the advantage that, by the use of the flexible internal tank or liner, it is possible to install such an internal tank by collapsing the flexible material and forcing it into the external tank through an existing manway, and then inflating or drawing the internal tank into its operative position in juxtaposition to the inner side of the external tank. Similarly, if it should be known that the internal liner has developed any type of leak over an extended period of usage, it is possible to extricate this flexible internal tank in the same way that it was originally installed, i.e. by removing it through a manway or other existing opening in the external tank, and then repairing it outside of the external tank, or completely replacing it with a new liner, all without the expense of excavating the entire system from the earth in order to make the necessary repairs.

As a part of the system described in U.S. Pat. No. 4,796,676 and U.S. patent application Ser. No. 429,073, the means by which the interstices between the flexible internal tank and the rigid external tank is evacuated is illustrated and described in detail. As a part of this system for evacuating this space, the system also includes means by which the negative air pressure within this space is continuously monitored, and can be restored periodically, as may be necessary to account for inherent and unavoidable slow leakage due to gas permeability of both the flexible internal tank and the rigid external tank. The system which is used to monitor and to evacuate the interstices between the flexible internal tank and the rigid external tank also is capable of removing liquid from a sump or low zone between the tanks when such liquid accumulates at that location.

BRIEF DESCRIPTION OF THE PRESENT INVENTION

The present invention provides a two-stage vacuum system which is used for continuously monitoring the state of the negative air pressure between an internal tank or container and an external tank which is generally, though not necessarily, a rigid single wall tank of steel or Fiberglas ®. The two-stage vacuum system continuously monitors the magnitude of the vacuum in the interstices between the internal tank and the external tank, and in addition provides a visible and audible indication of leakage occurring at a rate which is abnormal (above the rate due to the inherent gas or liquid permeability of the tank). The system thus provides for an awareness to be had above ground and externally to the tank system of a loss of integrity justifying concern, and warranting further and more intense testing.

The two-stage vacuum unit further includes a high pressure stage in which a high vacuum is developed in the interstices, and particularly, at a sump or low point between the internal tank and the external tank so that any liquid accumulated there can be drawn out and identified, and air can be swept through the interstices to clean and purge the inner surface of the external tank and the external or outer surface of the internal tank.

When using this high pressure testing system, it is possible to determine more accurately the magnitude of the leakage or loss of integrity, and it is possible to more precisely identify the source of such leakage; that is, whether it is the external tank or the internal tank which is leaking, and to some extent the location in the internal tank where the leak exists, if, in fact, it is in the internal tank where the leak is to be found.

More specifically, the two-stage vacuum system of the invention includes a continuous monitoring stage which uses a relatively low level of vacuum in the interstices and in the conduit distribution network in order to verify liquid tight integrity of the entire system. Several double-walled tanks of the type described can be concurrently monitored for such integrity using low level vacuum for this purpose.

In the use of the low level vacuum (between about 20 mm HG and 100 mm Hg is adequate for the relatively small volumetric space which is characteristic of the interstices between the inner tank and the rigid outer tank), the magnitude of this vacuum or the negative air pressure is constantly monitored by means of pressure gauges. One of these gauges includes a differential switching system which energizes and de-energizes the vacuum pump connected to the interstices in order to automatically periodically restore the vacuum to the higher end of a selected range. The restoration of vacuum is accomplished in a short time after the vacuum has slowly decreased as a result of the inherent permeability of the materials of construction of the two walls of the tank. The sensitivity with which the decrease in vacuum due to the natural permeability of the tank walls is measured, coupled with the small amount of space in the interstices, makes it possible to detect even a minute leak in the system. Typically, a vacuum decrease of about 12.7 mm Hg in a period of about twelve hours is a loss of vacuum of sufficient magnitude to alert the operator of the system to the existence of a potential leakage problem.

The system includes a main vacuum line connected through a vacuum interstices adaptor secured in the external tank, and communicating with the interstices between the tanks. This permits this space to be connected to the low level vacuum loop during the continuous monitoring and periodic restoration of such vacuum to accommodate and compensate for a certain tolerable level of inherent or natural leakage of the system. A second line is connected through the vacuum interstices adaptor to a sump at the bottom of the tank between the external and internal tank which is sufficiently low to permit any liquid in the interstitial space to gravitate into the sump. This second line is connected to the vacuum pump through a solenoid switching system, and can be used at a time when the gauges used to continuously monitor the low level vacuum in the interstices have been isolated to protect them from damage by high vacuum. A high vacuum can then be applied to the sump, thereby drawing out any liquid which has accumulated in the sump.

During the continuous low level monitoring of negative pressure in the interstices, a counter is provided and is connected to the electrical system controlling the actuation of the vacuum pump. The counter registers the number of times that the vacuum pump has been actuated to restore the vacuum to the predetermined maximum level to be maintained in normal extended operation. If the system is performing properly, the time between cycles of the vacuum pump should remain fairly constant, and the count should be below an acceptable limit in order to provide assurance that the leakage which is occurring, and which requires periodic vacuum restoration is tolerable and due only to the natural permeability of the materials of which the tanks are constructed. As a further safeguard in the monitoring system, an adequate normal time for restoration of the desired maximum vacuum in the interstices is determined. Then, in the event that excessive time is required for the pump to restore adequate vacuum to the system, audible and visible alarms apprise the operator of the fact that the normal time period needed for the pump to restore maximum low level vacuum within the interstices is insufficient, and an excessive amount of leakage into the interstices resulting in excessive loss of vacuum is indicated.

In order to locate, test and verify the source of a suspected leak resulting from a loss of liquid integrity by either the internal tank or the external tank, a high vacuum operational mode is required. In this high vacuum mode, a much higher vacuum is pulled on the interstices via the low level liquid sump between the inner tank and the outer tank. In the high vacuum mode, a vacuum of between about 12 inches of Hg and 18 inches of Hg is employed. In order to protect the sensitive low vacuum gauges used in the continuous monitoring mode at the later time when the high vacuum is developed in the system, solenoid valves are utilized for isolating these gauges from the high vacuum lines and from the highly evacuated interstices.

In the high vacuum test mode, a line is connected between the vacuum pump and the sump in which any liquid in the interstices will accumulate. The same vacuum pump is generally used for both the low level vacuum employed in the continuous monitoring mode, and for the high level vacuum employed during the test mode. Appropriate switches which operate solenoid valves are employed for periodically switching from the substantially continuous low vacuum level monitoring mode to the testing mode in which a high vacuum is employed. In a preferred form of this system, several tanks are continuously monitored by a common monitoring system, with the overall integrity of a multi-tank array being indicated on the sensitive low level vacuum gauges. The system then provides for each of these several tanks in the array to be individually tested, using the high pressure test and verification mode. Controls are provided by which an operator can isolate the sensitive gauges used in the low vacuum monitoring mode from the pressure gauges employed in the high vacuum mode, and from the high vacuum developed throughout the system at that time of testing.

During the high vacuum testing and purging mode, liquid is withdrawn from the sump at the bottom of the double-waled underground liquid containment tank, and can be trapped at an external, above-ground location. It can then be analyzed to determine, for example, whether the liquid is that which is stored in the internal tank, thus indicating possible leakage through the internal tank, or whether it is water, suggesting that the external tank is leaking water from the surrounding earth into the interstices between the tanks. If little or no liquid is pulled from the sump during the high vacuum testing mode but a significant leak is indicated by rapid loss of the high vacuum as indicated on the high vacuum gauge provided, the leak then, of course, is gaseous, and in most instances is air. This may be due to a leak in the internal tank at a location above the level of the liquid stored therein, or it may be due to leakage of air through the external tank into the interstices. Gauges are provided for determining which of these sources of the air leak is responsible for the loss in vacuum. By pressurizing the space over the stored liquid in the internal tank, a positive pressure will be developed on an appropriate gauge provided in the system with the capability of indicating the existence of a positive pressure in the interstices if the internal tank is the faulty one which leaks. In a preferred embodiment, this gauge can be the same gauge used to measure and indicate the extent of a vacuum in that space during the high vacuum test mode.

As indicated, appropriate switching is provided to permit solenoid valves to be opened and closed as needed to permit each of the several tanks in a multiple tank array to be isolated and tested individually at high vacuum. The system also permits each tank to be purged or swept out with atmospheric air to clean the surfaces of the external and internal tanks adjacent the interstices and remove any liquid which may be there accumulated or adherent. Electrically controlled valves are also provided which enable various parts of the system to be tested for leak-free integrity so that an indicated leak in the system can be isolated and a determination quickly made as to whether a line in the system, or a fitting or the like, may have developed a leak, or whether there is, indeed, a loss of liquid tight integrity in one of the two walls of the double-walled liquid containment system.

An important object of the present invention is to provide a monitoring and testing system useful as an essential adjunct to a double-walled liquid containment system of the type in which a vacuum is both the means of retaining the inner tank adjacent the outer tank and in juxtaposition thereto, and also the means by which it is possible to continuously monitor the integrity of the tanks making up the double-walled system.

Another important object of the invention is to provide a system for monitoring an evacuated space between two walls by visible indications provided in an accessible location, so that an operator of the system can quickly and easily determine when the vacuum in the space between the two walls has been compromised as a result of the loss of liquid tight integrity in one or both of the walls, thereby permitting leakage to occur into the evacuated space.

Another object of the invention is to provide a two-stage vacuum integrity measuring system in which a low level of vacuum is continuously employed to advise an operator of the possible existence of a leak in the system, and a high vacuum mode is utilized to determine the nature of the leakage and the source thereof.

A further object of the invention is to provide a system for continuously monitoring the liquid tight integrity of a double-walled underground liquid containment system of the type typically located at automobile service stations, which monitoring system is of adequate simplicity to permit persons of little training in the technology of the system to use it effectively.

Another object of the invention is to provide a system of the type described which is of relatively light weight and can be used for monitoring one or several fluid containment systems simultaneously.

Additional objects and advantages of the present invention will become apparent as the following detailed description of a preferred embodiment of the invention is read in conjunction with the accompanying drawings which illustrate such preferred embodiment.

DETAILED DESCRIPTION OF A PREFERRED EMBODIMENT OF THE INVENTION

Figure 4:
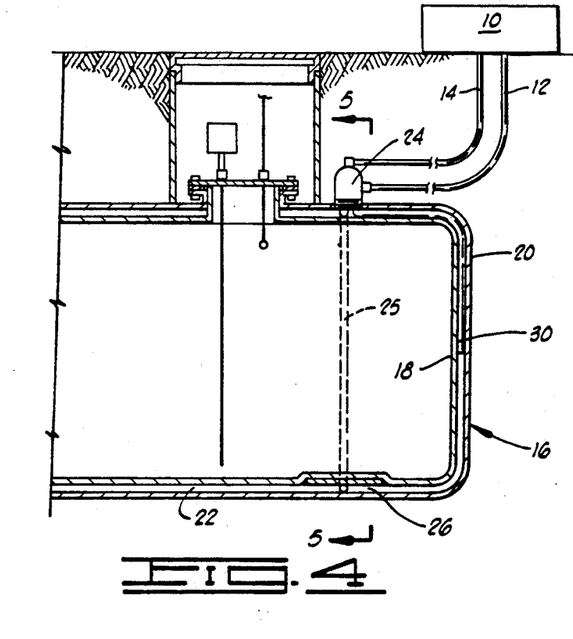
FIG. 4 is a diagrammatic illustration of a double-walled subterranean liquid containment tank coupled to the system of the present invention for continuous monitoring, and for testing of the tank with high vacuum for determining the character and location of a leak allowing the vacuum level in the interstices between the double walls of the tank to decrease.

Referring initially to FIG. 4 of the drawings, the two-stage vacuum monitoring and testing system of the invention is designated generally by reference numeral 10 and is shown as located above the ground in an accessible location. The vacuum system is connected through a pair of vacuum lines 12 and 14 to a subterranean liquid containment system or underground storage tank system, designated generally by reference numeral 16.

The underground storage tank system 16 to which the two-stage vacuum system 10 is connected is typically made up of an inner tank 18, which, in a preferred embodiment of the invention, is a flexible, liquid impermeable liner 18, and an external single wall tank 20. In the illustrated embodiment of the invention, the external tank 20 is a steel tank of generally elliptical cross-sectional configuration having a pair of opposed ends and a cylindrical central portion—a configuration typical of steel tanks of this type intended to contain a liquid stored therein.

An interstitial space 22 exists between the inner tank 18, and the outer tank 20 and, for clarity of illustration, is exaggerated in width in its depiction in the drawings. The interstitial space 22 is actually a space of very small volume between the outer surface of the internal tank or liner 18 and the inner surface of the external tank 20. The construction of one double tank system of the type described is explained in detail in co-pending U.S. patent application Ser. No. 429,073, the disclosure of which is incorporated in this application by reference.

The double-walled liquid containment system used as an underground storage facility has been selected for purposes of illustrating and explaining the functioning of the two-stage vacuum monitoring and testing system of the invention. Other types of containment systems which depend upon the use of a evacuated or low pressure space between a pair of tanks, or other confining structures which are substantially fluid impermeable, can, however, also be benefited by the use of the present invention in maintaining and monitoring the vacuum in the space between such confining members, and in periodically testing their integrity. It will also be understood that the two-stage vacuum monitoring and testing system of the invention can with equal facility, be used with above ground storage tanks in which an interstitial space is evacuated between two tank walls, and that the system is not limited to underground facilities, although some of its greatest benefits accrue to the user of the system in conjunction with such relatively inaccessible underground liquid storage facilities.

The two-stage vacuum monitoring and testing system 10 will be subsequently explained and illustrated in greater detail and is merely shown schematically in FIG. 4 for the purpose of locating the system in relation to a typical environment of its usage. Extending from the two-stage system 10 to an evacuated space located between two confining members are the vacuum conduits or lines 12 and 14. These lines 12 and 14 are shown as being attached to a vacuum interstices adapter 24 which is screwed into the upper side of the outer tank so that the hollow interior of the vacuum interstices adapter communicates with the interstitial space 22 between the two tanks 18 and 20. Other forms of attachment of the lines 12 and 14 than the vacuum interstices adapter 25 can also be used.

Figure 5:
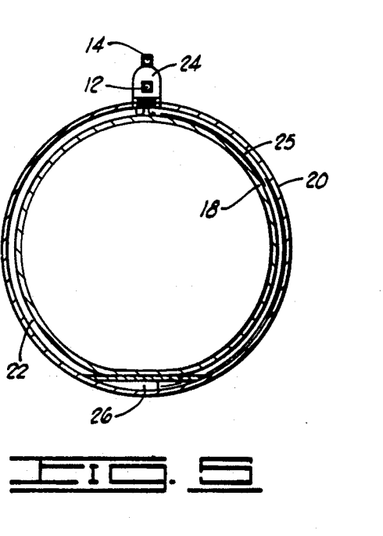
FIG. 5 is a sectional view taken along line 5—5 of FIG. 4.

The conduit or line 14, referred to as a sump line, attaches to the top of the vacuum interstices adapter 24. It extends downwardly through the vacuum interstices adapter and the registering opening in the outer tank 20. From this location the line 25 passes through the interstitial space 22 between the inner tank 18 and the outer tank 20 until its open lower end extends into a liquid accumulation space or sump 26. This arrangement is best illustrated in FIGS. 4 and 5 when these drawings are considered conjunctively. The sump vacuum tube or line 25, by reason of passing to the top of the vacuum interstices adapter 24, is not twisted by the rotation of the vacuum interstices adapter as such adapter is screwed into the opening in the tank The vacuum line 12 is connected to the side of the vacuum interstices adapter 24 and communicates with the interior thereof. Inside the vacuum interstices adapter 24, the vacuum line 12 is connected to a main vacuum line 30 which also passes into the interstitial space 22 between the two tanks as best illustrated in FIG. 4. It should be here pointed out, and will be later reiterated, that the line 12, referred to here as the main vacuum line, sometimes also functions as an air bleed or atmospheric air line for the purpose of allowing air at atmospheric pressure to bleed into the interstitial space 22 between the two tanks. At other times, it is indeed a main vacuum line in the sense that it is used continuously to monitor and to restore and maintain a reduced pressure of selected magnitude in the interstitial space between the tanks.

Figure 6:
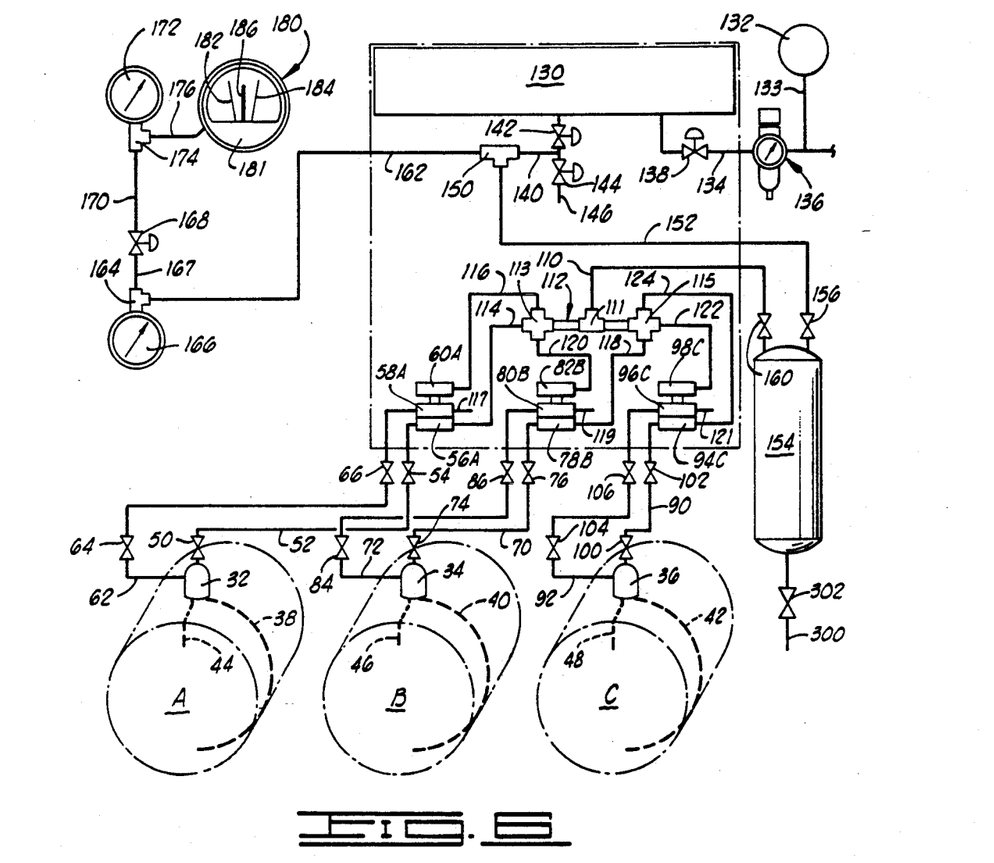
FIG. 6 is a vacuum flow-valve switching diagram showing the way the vacuum developed by the use of a single vacuum pump is employed for operating the system at different times according to the status of several valves which are switched at different times during operation of the system.

In FIG. 6 of the drawings, additional details of construction of the two-stage vacuum monitoring and testing system of the invention are illustrated. In this schematic or diagrammatic portrayal, the air flow layout of the two-stage system is depicted, and is shown as it appears when used for monitoring the vacuum in the described interstitial spaces, as well as for testing the inner and outer tanks defining such spaces in the case of three of the double tank liquid storage facilities. These three double tank systems are denominated by reference letters "A", "B" and "C". A vacuum interstices adapter 32 is associated with the double containment storage tank "A", and a vacuum interstices adapter 34 is used on double tank storage facility "B". The vacuum interstices adapter on facility "C" is denominated by reference numeral 36.

In the case of storage tank facility "A", the vacuum line to the sump is denominated by reference numeral 38. The sump line, in the case of tank facility "B", is denominated by reference numeral 40, and sump line 42 is used in the case of tank facility "C". The main vacuum lines from the respective vacuum interstices adapters are vacuum lines 44, 46 and 48 in the case of tank facilities "A", "B" and "C", respectively. The sump line 38, after passing out through the vacuum interstices adapter 32 is connected through a suitable manually operated valve 50 to a sump vacuum line 52, which then passes through another manual valve 54 before being connected to a solenoid valve 56A. The solenoid valve 56A is one of three manifolded solenoid valves 56A 58A and 60A. The main vacuum line 44 associated with the double tank system "A" is connected through the vacuum interstices adapter to a line 62, which is connected serially through a pair of manually actuated valves 64 and 66 to the solenoid valve 58A. This valve is one of the three manifolded solenoid valves 56A, 58A and 60A.

In a similar fashion, the sump line 40 and main vacuum line 46, which are associated with the double tank system "B" and vacuum interstices adapter 34, are connected through the vacuum interstices adapter to lines 70 and 72, respectively.

Figure 7:
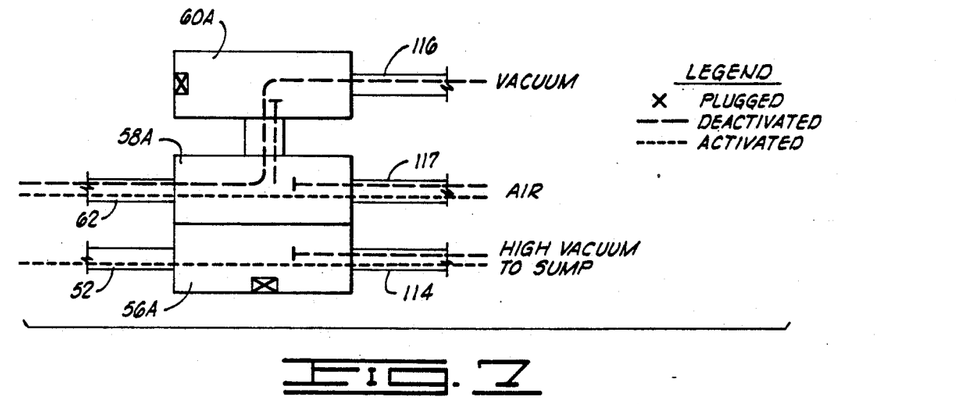
FIG. 7 is a diagrammatic illustration of three solenoid valves manifolded together as they are used at one point in the system.

The sump line 70 passes through the hand actuated valve 74 and hand actuated valve 76, and is connected to a solenoid valve 78B forming a part of a second three solenoid valve array. The second array of three manifolded solenoid valves includes, in addition to valve 78B, the valves 80B and 82B connected as shown in FIGS. 6 and 7, and hereinafter described. The line 72 which is connected to the main vacuum line 46 passes through the hand actuated valve 84 and a hand actuated valve 86, before being connected to the solenoid valve 80B.

Finally, the double-walled tank system "C" has the sump line 42, extending to the sump thereof, connected through the vacuum interstices adapter 36 to a sump vacuum line 90, which passes through hand actuated valves 100 and 102 and is connected to the solenoid valve 94C. The solenoid valve 94C is one of three manifold valves which also include the solenoid valves 96C and 98C, which three valves are manifolded together in a common array as shown in FIG. 6, and more comprehensively described hereinafter in referring to FIG. 7. The main vacuum line 48 is connected to the line 92 which passes through manually actuated valves 104 and 106, and is connected at its end opposite the vacuum interstices adapter 36 to the solenoid valve 96C.

The vacuum for use in evacuating the interstices between the walls of the double tanks in the tank systems "A", "B" and "C", as well as for pulling the liquid out of the sumps of each of these tank systems, is developed through line 110 (see FIG. 6), which is connected to a vacuum manifold designated generally by reference numeral 112. The vacuum manifold 112 includes fittings 113 and 115. Line 116 extends from the fitting 113 to the solenoid valve 60A forming a part of the array of the three valves 56A, 58A and 60A. Similarly, a vacuum line 114 passes from the fitting 113 to the valve 56A. From the fitting 115, a vacuum line 124 extends to the valve 94C, and a vacuum line 122 extends to the solenoid valve 98C.

Before discussing in detail the three arrays of three manifolded solenoid valves associated with each of the tank systems "A", "B" and "C", it should be pointed out that each of the three valve arrays or manifolds used in the system includes a conduit or line which is open to the atmosphere. Thus, in the case of the three valves 56A, 58A and 60A, this atmospheric vent or opening is denominated by reference numeral 117. The air line open to the atmosphere in the case of the solenoid valve 80B is denominated by reference numeral 119, and the air valve which is connected to the solenoid valve 96C, in the last of the three valve manifolds or arrays, is denominated by reference numeral 121.

The source of vacuum for the system is a vacuum pump 130 powered by compressed air from a compressor 132. Compressed air from the compressor passes through a line 133 to a pressure gauge and throttling system 136 and into a line 134. The line 134 passes through a normally closed solenoid air valve 138 which is electrically opened to allow the compressed air from the compressor 132 to actuate the vacuum pump 130.

The capacity of the vacuum pump is determined by the number and size of tanks to be monitored. In addition to the compressed air operated vacuum pump here described, an electric rotary vane oil-less vacuum pump can also be used.

The vacuum pump 130 pulls a vacuum on the vacuum line 140 through a solenoid actuated check valve 142. An air bleed valve 144 is connected through a tee 150 to the line 152 to permit atmospheric air to enter the system via line 146, and thus vent the evacuated system when the valve 144 is opened. The vacuum line 140 is connected through the tee 150 to a vacuum line 152 extending to a vacuum tank 154. The hand actuated valve 156 controls the flow of air in the line 152. The line 110, having one end connected to a tee 111 of the vacuum manifold 112, extends through a manually actuated cut-off valve 160 to the vacuum tank 154.

From the tee 150, another vacuum line 162 extends to a tee 164 which is connected to a high vacuum gauge 166, and also by line 167 to a solenoid actuated safety valve 168. The safety valve 168 is connected by line 170 and a tee 174 to a low vacuum gauge 172, which is graduated in mm Hg, and also to a low pressure differential switching system 180.

Figure 2:
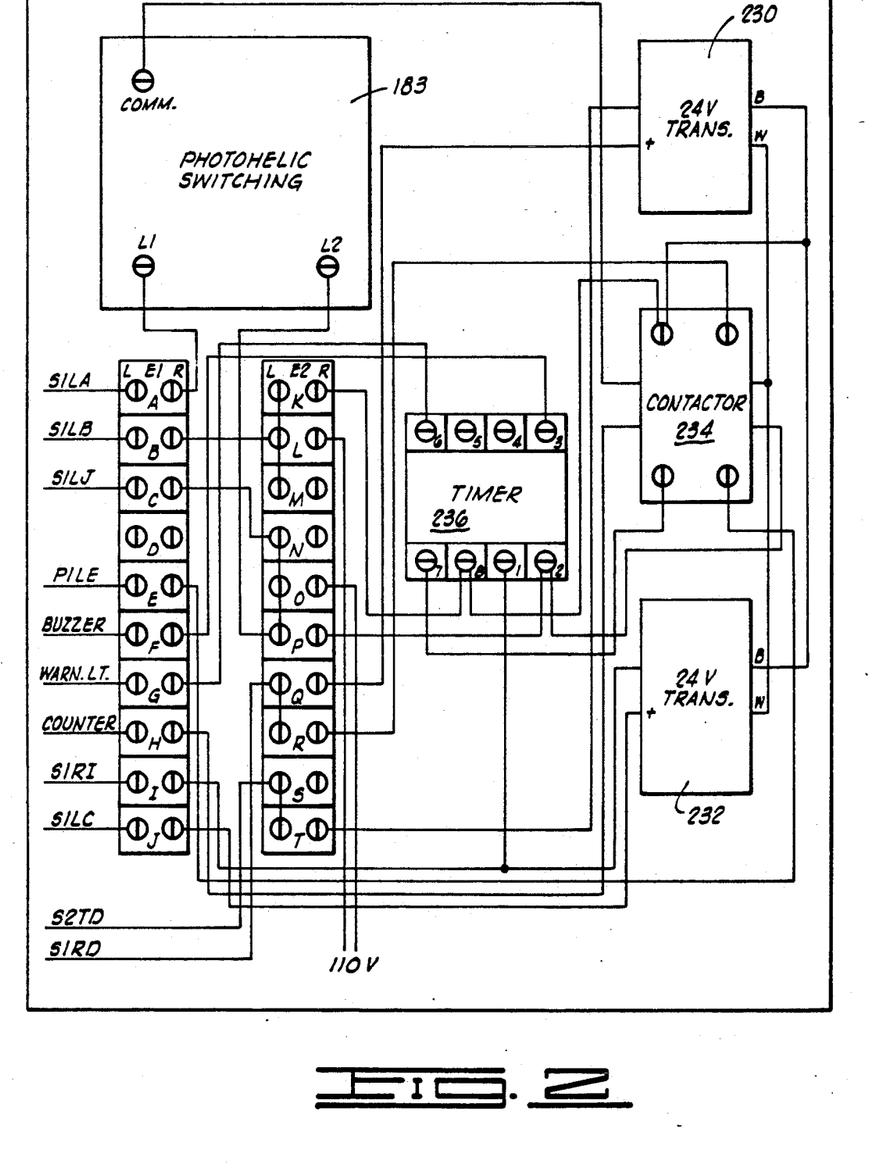
FIG. 2 is a an electric wiring diagram illustrating certain parts of the control system used particularly in the continuous monitoring of the vacuum integrity in the interstices between the double walls of a liquid containment system.

The low pressure differential switching system 18 includes two parts. The gauge part of the system is depicted in FIG. 6 and is denominated by reference numeral 181. The switching portion of the low pressure differential switch system 180 is shown in FIG. 2 of the drawings, and is denominated by reference numeral 183 and will be hereinafter described. A low pressure differential switching system which is commercially available, and has worked well in use, is sold under the trademark PHOTOHELIC by the Dwyer Corporation.

The gauge 181 is a low pressure vacuum gauge which is graduated in inches of water, and, in cooperation with the switch 183, can be selectively set to perform a switching function in response to certain variations in the relatively low vacuum applied thereto during the low vacuum monitoring operation of the two-stage vacuum system of the invention. As the low pressure gauge 181 is viewed in FIG. 1, a pair of vacuum range boundary lines or wands 182 and 184, which include contact elements (not shown), are set to determine a range of negative pressure over which the system will be allowed to drift between cycles of the vacuum pump 130. The range set on the low pressure differential switching system 180 for this device to perform its switching function is pre-selected so that the vacuum pump will only periodically be actuated. This occurs by closure of an appropriate circuit to open the air check valve 138 and the valve 142 in accordance with what is deemed to be a reasonably slow reduction in the vacuum of the system occurring through acceptable inherent leakage due to the permeability of the inner and outer tanks. Also forming a part of the low pressure differential switching system 180 is a movable wand or pointer 186 which responds to the vacuum in the interstices to pivot slowly from right to left as the vacuum decreases until contact is made with a contact carried on one or the other of the wands 182 and 184.

As will be explained, at a time when the vacuum has been slowly lost down to a certain predetermined level, the vacuum pump 130 will be actuated by the admission of compressed air through the solenoid valve 138 so as to restore the vacuum in the interstices to a higher level. This will require the vacuum pump 130 to run for a certain period of time, and as the vacuum in the interstices is restored, the pointer 186 will move to the right until it reaches the point where the wand 184 has been set. At that point, by contact of a contact carried on the wand, the pointer will cause the circuit to be opened, closing the valves 138 and 142 by solenoid action, and stopping the flow of compressed air to the vacuum pump 130. The vacuum pump 130 will thus be de-energized at this time, and the vacuum in the interstices 22 between the dual walls of each of the three tank systems "A", "B" and "C" will have been restored to an acceptable maximum level of vacuum.

The right wand 184 is pre-set to a value on the gauge which is the maximum vacuum which is to be established within the system by the vacuum pump during the automatic monitoring, or low vacuum stage of operation of the system, whereas the left wand 182 is set to provide an indication of the least vacuum (highest negative pressure) which will be existent in the interstices at a time when the vacuum pump is to be actuated by the low pressure differential switching system 180. At this time the switch contacts in the low pressure differential switching system function to close circuitry so as to actuate the vacuum pump and restore the vacuum to the high end of the vacuum range, as indicated by the right wand 184 of the low pressure differential switching system. The moving finger or pointer 186 moves back and forth between the wands 182 and 184 in correspondence to the changing negative pressure within the interstitial spaces between the paired tanks of the three systems. This gradual loss of vacuum is due to the slow bleeding of gas through the tank walls within tolerable acceptable limits characteristic of the materials of which these vessels are constructed. The operation and use of the low pressure differential switching system 180 will be further explained in greater detail at a later point in the discussion.

Before proceeding to an identification and description of the various electrical components of the system, and the manner in which they are utilized for continuously monitoring the vacuum developed in the interstitial spaces 22 in the tanks, and for periodically testing the two tanks for leakage, a further word of explanation of the manifolding and manner of functioning of the three manifolded solenoid valve arrays shown in FIG. 6 will be described. One of these three solenoid valve arrays is illustrated schematically in FIG. 7, and the explanation thereof will apply to each of the three arrays shown in FIG. 6, with one three-value array being associated with each of the tank systems "A", "B" and "C". For purposes of explanation, these three solenoid valves which are to be described in referring to FIG. 7 will be identified as the valves 56A, 58A and 60A, although it will be understood that either of the other two three-valve arrays could be here identified just as well.

Each of the solenoid valves 56A, 58A and 60A is a three port valve with a port at each of the opposite ends and a lateral port at one side thereof. In the case of the valves 58A and 56A, these valves are turned so that the lateral port of the valve 56A is plugged, as indicated by the "x" at that location, and the lateral port of the valve 58A is connected to the lateral port of the valve 60A in the indicated status of the valves. One of the end ports of the valve 60A is plugged, as indicated by the letter "X", and as stated, the same is true of the lateral port in the valve 56A.

At a time when solenoid valve 60A is de-actuated, vacuum applied to the line 116 (see FIGS. 6 and 7) is pulled through the interconnected lateral ports into the valve 58A. This valve is, at this time, deactivated so that the port to the line 62 (see FIG. 6) is open to communication with the interior of the valve 58A. Thus, at this time, vacuum is applied through the deactivated valves 60A and 58A to the line 62, which in turn will apply vacuum to the interstitial space 22 between the tanks 18 and 20 of tank system A.

If valve 58A is activated and valve 60a is concurrently activated, then atmospheric air can pass through the valve 58A from a short conduit 117 open to the atmosphere (see FIG. 6), and air at atmospheric pressure will pass as a purge stream through the line 62 into the interstitial space between the two tanks of the "A" tank system.

With respect to the solenoid valve 56A, when this valve is activated, a relatively high vacuum (as hereinafter described), will be applied via the line 114 through the valve 56A to the high vacuum sump lines 52 and 38 to the sump 26 located at the bottom of the double tank liquid containment system "A" in the tank array shown in FIG. 6.

The described method of functioning of the three-valve array, as FIG. 7 has been referenced, applies precisely the same to each of the other two three-valve arrays, and is used to permit each of the tanks to be monitored continuously and concurrently, and also to permit each of the double-walled tank systems to be individually tested periodically, all as hereinafter described. It may be further helpfully commented at this point that one function of the switching of the solenoid valves in each of the three-valve arrays is to permit a vacuum of a given magnitude to be continuously monitored, maintained or restored in the interstitial space in each one of the three tank systems. It also functions to permit any liquid which has leaked into the interstitial space, and gravitated into the sump of any of the three tank systems "A", "B" or "C" to be periodically removed, so that such liquid can be tested to determine its source. Finally, it also functions to permit the interstitial space to be periodically purged with air to strip moisture off the facing sides of the double tanks which define the interstitial space, and to permit periodic testing to be carried out for the purpose of locating and identifying the nature of any leak which may develop in either the external tank or the internal tank. These monitoring and testing functions of the system of the invention will be hereinafter explained in greater detail.

Figure 1:
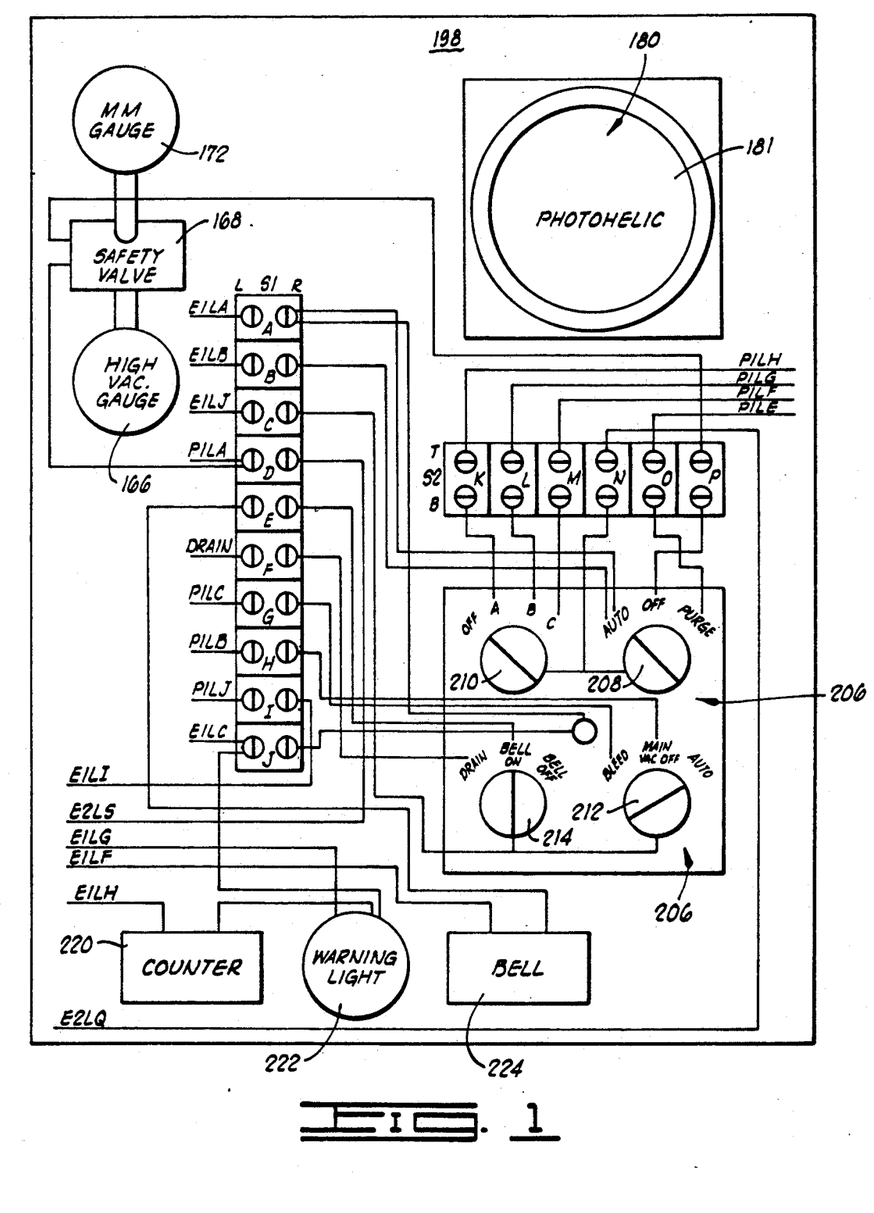
FIG. 1 is a diagrammatic illustration of a control panel forming a part, and utilized in the operation, of the monitoring and testing system of the invention.

A control panel 198 is portrayed in FIG. 1 of the drawings, and on it are mounted various electrical circuitry and switching elements employed in the invention. The low pressure gauge 181 of the low pressure differential switching system 180 is illustrated; the switching part of the assembly is denominated by reference numeral 183 and is shown in FIG. 2 of the drawings.

Also located on the control panel 198 are four manually operated primary control switches. These switches are mounted on a subpanel denominated generally by reference numeral 206. They include a three-position switch 208 located in the upper right corner of the subpanel 206, and a four-position tank testing switch 210 having an "OFF" position and an "A", "B" and "C" position. This switch 210 is shown at the upper left corner of the subpanel 206. At the lower right corner of the subpanel 206, another three-position switch 212 is provided, and it is connected to the main vacuum solenoid valves 60A, 82B and 98C located in the three arrays of valves hereinbefore described, and to the solenoid valve 144. Finally, the three-position switch 214 is provided in the lower left corner of the subpanel 206, and it functions in cooperation with a timer (hereinafter described) to control an alarm bell 224 which may be turned "ON" or "OFF" at certain times. The switch 214 is also used to drain any liquid which may be accumulated in the volume tank 154 via the drain line 300 and solenoid valve 302. Switches on the subpanel 206 are connected through terminal boards S1 and S2 and electrical circuitry to various other electrical components making up the control system, and hereinafter described. One of these components is the solenoid operated safety valve 168 hereinbefore described, and shown in FIGS. 1 and 6. The safety valve 168 is connected through the terminal blocks S1 and S2 to the manually operated switch 208 on the subpanel 206.

Also located on the control panel 198 are an electrically actuated resettable counter 220 which functions to count the number of times the vacuum pump is cycled during the low vacuum continuous monitoring stage of operation of the system. A warning light 222 is also provided, as is the bell 224 or audible alarm. The resettable counter 220 visually portrays, as a digital readout, the cumulative number of times that the vacuum pump 130 has been cycled by being turned on, and then turned off after a certain desired level of vacuum has been restored to the interstices within the three tank systems "A", "B" and "C". The counter thus registers the cycles of the pump, and provides an indication of whether the frequency with which the pump is cycled is indicative of an excessive rate of leakage of gas through the wall of the inner tank and/or the wall of the outer tank into the interstices. The warning light 222 and bell 224 also provided on the control panel provide a visible and audible alarm when conditions exist in the system indicative of excessive leakage, or other malfunction of the system.

In order to interconnect, in the manner required, various electrical components used in the electrical circuitry employed in the invention, contact carrying terminal boards, such as terminal boards S1 and S2, are provided. The terminal board provided on the control panel 196 and denominated S1 includes a left side "L", and a right side "R", as a way of identifying contacts located in terminal board blocks "A" through "J". Thus, a wire leading from somewhere else in the circuit to the terminal board S1 may be referred to, for example, as S1LD (see FIG. 3), and this will mean that wire is connected to the left contact in block "D" on terminal board S1.

In the case of the second terminal board S2 provided on the control panel 196, the contacts are said to be located on the top "T", or the bottom, "B", of this terminal board. The blocks in this terminal board having a pair of contacts on each bock are denominated by letters "K" through "P".

In further explanation of the manner in which the circuitry wiring is schematically illustrated in the drawings, the top electrical lead leading from the left contact and block "A" of the terminal board S1 is labeled E1LA This refers to the fact that this particular lead will be extended to the terminal board E1 shown in FIG. 2. Here, the electrical lead from contact S1LA is shown connected to the left contact in the first block (the "A" block), of terminal board E1 as shown in FIG. 2 (hence its designation E1LA on terminal board S1).

FIG. 2 illustrates other parts of the electrical circuit which are used in the two-stage vacuum control system. In addition to the terminal board E1, a second terminal board E2 containing blocks "K" through "T" is illustrated. There is also illustrated a pair of 24 volt transformers, 230 and 232, which are connected to a contactor 234, and to various contacts on the terminal boards E1 and E2. A timer 236 includes a number of contacts which are variously connected to the contactor 234, the transformers 230 and 232, and to the terminal boards E1 and E2. The switching portion 183 of the low pressure differential switching system 180 is also shown connected in the circuitry in FIG. 2. The timer 236 is electrically connected to the vacuum pump 130, warning light 222 and bell 224.

The timer 236 is a device which can be preset so as to close a circuit(s) when a predetermined time interval has elapsed. The purpose of the timer is to cause the warning light 222 and the bell 224 to be turned on, and to thus provide visual and audible indications of a malfunction in the double-walled containment system. The malfunction is, in turn, of a type which causes an unnecessarily long running time of the vacuum pump 130 in order to completely restore a desired level of vacuum in the interstices in the double-walled tank systems "A", "B" and "C". Any one of the tank systems may have a leak which causes the vacuum pump 130 to either run continuously without stopping in unsuccessfully trying to restore the vacuum, or to take an excessively long time to restore the vacuum. In either case, the time interval during which the vacuum pump runs before turning off will exceed the interval which has been set on the timer 236, and this causes the timer to function to turn on the warning light 222 and the bell 224. The function of the switching portion 183 of the low pressure differential switching system 180 is to switch on each time the low pressure gauge pointer 186 drifts leftward until it is against the wand 182. This opens the solenoid valve 138, and allows compressed air to pass to the vacuum pump 130, thus turning on the vacuum pump to restore the vacuum to its maximum level in the interstices between tanks via valve 142 which is also open at this time.

At the point where the vacuum is restored to the set maximum level as indicated by the wand 184 on the gauge 181, the vacuum pump 130 will be turned off, so that one cycle of the pump is registered on the counter 220. If this time of running of the pump is unacceptably long, then the timer functions in its role of closing electrical circuits to the warning light 222 and the alarm bell 224, so that these devices provide indications to an operator that the system needs to be checked thoroughly because of the apparent presence of an excessive leak in one of the walls in one or more of the double tank systems.

Figure 3:
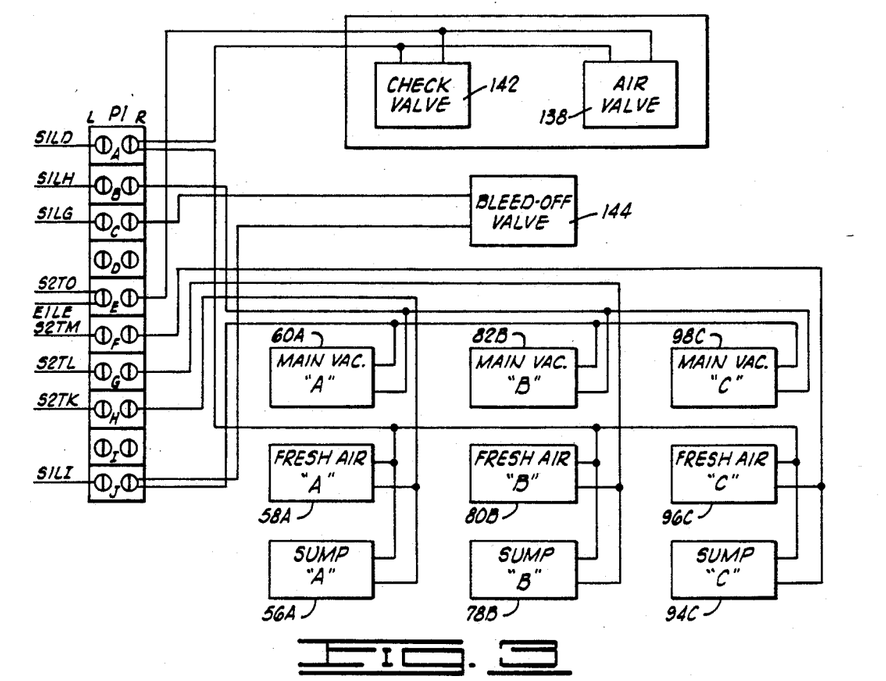
FIG. 3 illustrates diagrammatically another portion of the system by which a relatively low level of vacuum is selectively directed by a series of solenoid valves for continuously monitoring a tank array containing three tanks, and by which, in a different mode, a high vacuum is employed for individually testing each of these tanks for leakage, and for identifying the source of such leakage as is detected.

Another part of the electrical circuitry is illustrated in FIG. 3, where a terminal board P1 having terminal blocks "A" through "J" is connected to the check valve 142, the air valve 138 and the bleed-off valve 144. The terminal board P1 is also connected to the three solenoid valve arrays associated with tank systems "A", "B" and "C". Thus, these arrayed solenoid valves shown connected to the terminal board P1 include, in the "A" array, the valves 56A, 58A and 60A. The valves in the "B" array include solenoid valves 78B, 80B and 82B. The valves in the "C" array include, as previously indicated, the solenoid valves 94C, 96C and 98C.

OPERATION

It will be understood, of course, that the drawings here provided, and the description of the structural elements appearing in the drawings as herein previously elucidated, exemplify use of the two-stage vacuum system to concurrently monitor three underground storage tanks of double-walled construction. More or fewer tanks could be simultaneously monitored, but a typical service station array of tanks may often include three. What occurs in any one of the tanks is generally true of each of the tanks concurrently monitored and periodically individually tested.

At the outset, the interstitial space 22 between the inner tanks 18 and the external tanks 20 in each tank system "A", "B" and "C" is evacuated through the use of the vacuum pump 130, or by any suitable vacuum device, until the vacuum has reached a desired magnitude. This functions to draw the flexible inner tanks 18 against the metallic or Fiberglas ® outer tanks 20 in those systems where the inner tank is a flexible liner, such as the inner tank 18 of the present system. If the inner tank 18 has a reticulated, embossed surface on the outer side thereof, as described in U.S. Pat. No. 4,796,696, there still remains a very small interstitial space between the inner tank and outer tank, and it is this space which is evacuated, or any other type of interstitial space which exists in the case of differently constructed tank systems, such as where both tanks are rigid.

Once the vacuum has been established in the interstices, it is continuously monitored and the tank integrity is periodically tested with the two-stage vacuum system of the present invention.

The monitoring of the vacuum in the interstices 22 between the inner and outer tanks in the tank systems "A", "B" and "C" occurs by connecting the vacuum lines in the manner which has been hereinbefore described, and by estabishing the electrical circuitry as described. With this arrangement, the solenoid actuated safety valve 168 is open at this time so that the relatively low vacuum (on the order of from about 20 mm Hg to about 100 mm Hg) which has been developed in the interstitial space can act upon the low vacuum gauge 172 and upon the vacuum gauge 181. The gauge 181 has been previously set in the manner described, so that the pointer 186 will slowly drift from the right toward the left, and between the bounds established by the wands 182 and 184, as the vacuum existing within the interstices is very slowly lost.

Gradual loss of vacuum will occur due to a minute amount of inherent and necessary leakage in the confining tank structures, as well as in the lines and fittings of the vacuum monitoring system of the present invention. This very slow leakage is an acceptable characteristic of the double tank containment system when monitored by the present invention, as long as the rate of decrease of the vacuum is repeatedly within acceptable limits. This is determined by the response of the low pressure differential switching system 180 to changes of the vacuum within the interstices of the several double-walled tank systems.

At the time when the vacuum has been newly established and is at or very near its maximum value (lowest pressure), the pointer will be near the wand 184 and will begin to drift very slowly to the left. This will typically continue, with the system of the present invention used on three double tank structures of the type shown in U.S. Pat. No. 4,796,696, over a period of about 24 hours. After the leftward traverse of the pointer 186 is completed, the switching system 183 will cause the solenoid air valve 138 to be actuated so as to open this valve, and to concurrently open valve 142. When this occurs, compressed air from the compressor 132 will actuate the vacuum pump 130 to pull a vacuum on the system. The pressure is thereby reduced and vacuum is restored to its maximum preset level after the pump has run for a given time. As the vacuum pump 130 runs, and the vacuum in the interstices is built up, the pointer 186 of the low pressure differential switching system moves toward the right, indicating that the vacuum in the system is being increased.

When the pointer 186 reaches the maximum vacuum marker 184 on the low pressure gauge 181, the circuit will then be opened by the actuation of the switching structure 183. The opening of the circuit at this time will cause the air valve 138 and the valve 142 to close, thus interrupting air flow from the compressor 132 to the vacuum pump 130. There has thus now been completed one cycle of the vacuum pump 130 in the normal functioning of the monitoring system, with the pump acting to restore the vacuum within the interstices to the preset level. This cycle of the pump from an "ON" and running status, to an "OFF" status, causes one cycle to be registered on the counter 220.

The description thus far contemplates a normal and operationally trouble-free functioning of the system in which no leaks have developed in either the inner tank 18 or the outer tank 20. In the event, however, that any abnormal leak, other than the natural breathing and slight vapor permeability of the tanks, should occur at any time, the result will be that the vacuum in the interstices will be more rapidly lost, the pointer 86 in the low pressure differential switching system will fall off to the left of the gauge more rapidly, and the pump will more frequently cycle. This will cause the counter 220 to register a greater number of pump cycles in the same period of time (higher frequency), and such a cycling of the pump which is too rapid will be understood to indicate that the loss of vacuum in the interstices is occurring more rapidly than should be the case if there are no intolerable leaks in either the inner tank or the outer tank.

Where the counter 220 indicates that the pump 130 is cycling slightly faster than desirable, it may be advisable to observe the counter for awhile to make sure that the excessively rapid cycling of the pump continues. If it does, then further trouble shooting actions of the sort hereinafter described need to be taken.

Another indication of malfunction occurs at a time when it takes the vacuum pump 130 an inordinately long period of time to restore the vacuum in the interstices between the inner and outer tanks of the tank systems "A", "B" and "C". Thus, if the timer 236 has been preset to cooperate with the low pressure differential switching system 180 and the vacuum pump 130 so that a time period of two minutes is the time normally required for the pump to run in order to restore the vacuum to its preset maximum value, and the pump instead requires five minutes, this will cause the timer to activate the warning light 222 and the bell 224. This immediately apprises an operator of the fact that the pump 130 is being required to run excessively in order to restore the vacuum to the preset maximum level. This in turn indicates to the operator that a leak exists somewhere in one of the tanks of the three tanks in the array, or perhaps in the lines or fittings making up the system.

Before moving to a discussion of the high vacuum second stage testing mode used in the operation of the invention, it will be helpful to further explain some additional aspects of the operation of the continuous monitoring mode at a relatively low vacuum. At a time when the vacuum pump 130 is actuated by closure of the switch elements within the switch 183, in conjunction with operation of the low pressure gauge 181, vacuum is pulled through the various lines of the system. As shown in FIGS. 6 and 7, a vacuum is developed via the line 116, through the solenoid valves 60A and 58A and through the line 62 and the line 44 to the interstices 22 of the tank system "A". The same action is occurring at this time in the case of double-walled fluid or liquid containment systems "B" and "C". It will be noted, in referring to FIGS. 3 and 7, that the status of the circuitry is such that solenoid valve 60A is electrically deactivated, and that solenoid valve 58A is also deactivated. This status of these solenoid valves remains the same during the continuous monitoring of the vacuum in the interstices when the vacuum is at a relatively low level.

At this time, this vacuum will be indicated on the low vacuum gauge 172, graduated in mm Hg, and on the gauge 181 of the low pressure differential switching system, which gauge is graduated in inches of water. The system is isolated (closed in) when the vacuum pump 130 is not running by the closure at this time of the check valve 142. Thus, the system is a closed system at the time the vacuum pump is not running during the monitoring phase of the operation, and the vacuum in the system will be maintained at this time except for the very small amount of inherent leakage previously described. The cyclic operation which has been described as characteristic of the vacuum pump 130 is thus also characteristic of the automatic switching of the switch 183 of the low pressure differential switching system 180 to periodically effect the opening and closing of the air valve 138 and the check valve 142. The vacuum tank 154 acts as a reservoir to provide a vacuum reserve which can aid in maintaining the vacuum throughout the system against the possibility of very small and tolerable leaks more rapidly depleting the vacuum than would occur without such tank.

It may be pointed out that at some locations throughout the system, it may be desirable to shut in or isolate parts of the system, and to simply check such various parts for leaks These can be detected by one of the indications provided by the rapid depletion of vacuum shown on the low pressure gauge 172, the excessive number of counts registered on the counter 220, or the sounding of the warning light and alarm bell. Where such testing of various parts of the system is desirable in order to try to locate the leak, the various manually actuated valves provided in the system can be closed when the system cycles, and an indication of the location of the leak can frequently be learned from such isolation.

The more accurate, more rapid and most effective manner of locating any leak which may have developed in the system, however, is to switch to the high vacuum testing mode of operation of the system of the invention.

In preparing to operate in the high vacuum testing mode, the switch 208 on the subpanel 206 is turned from the "AUTOMATIC" to the "OFF" position. When this occurs, the solenoid safety valve 168 is closed so as to isolate the low vacuum gauges 172 and 181 from the high vacuum which is about to be developed in the system. These low vacuum gauges, if subjected to the high vacuum used in the testing mode, might be damaged, and hence their isolation by closure of the safety valve 168 is necessary at this time.

The four-position switch 210 is moved from the "OFF" (left-most) position to the "A" position at this time. This places the double tank system "A" in communication with the high vacuum which is to be developed. The high vacuum mode of operation for testing the tanks tests one of the tanks at a time, and isolates the remaining two tanks from the high vacuum as the one tank is being tested. Prior to turning the switch 210 to the "A" position, the three-position manual switch in the lower right hand corner of subpanel 206 is turned so that the switch indicator points vertically to the "main vacuum off" position. This closes the main vacuum solenoid valves to each of the individual tank systems "A", "B" and "C". These valves will remain closed during all of the high vacuum testing and purging of the individual tanks. When the switch 210 is switched from the "OFF" position to the "A" position, the air bleed-in solenoid valve 58A, and the sump solenoid valve 56A associated with tank "A" are actuated. When this occurs, the high vacuum developed in the system will be applied to the sump of tank system "A", and the interstices will be opened to the atmosphere to allow atmospheric air to bleed into the interstices via the line 117 and valve 58A. Valve 60A is closed at this time.

After switch 210 has been moved to the "A" position, switch 208 is turned to the right to the "PURGE" position. The result of this is that the safety valve 168 remains closed, and the vacuum pump 130 is actuated as a result of the opening of the valves 138 and 142. At this time the vacuum pump 130 is caused to run continuously as long as the switches 208 and 212 on the subpanel 206 are in the described positions Thus the vacuum is continuously increased in the interstices of double tank system "A", until it reaches a level of from about 12 inches of Hg to about 18 inches of Hg. The magnitude of the vacuum is indicated on the high vacuum gauge 166 which is connected to the system via the line 162. The low vacuum gauge 172 and the gauge 181 of the low pressure differential switching system 180 are isolated from the high vacuum by the closed safety valve 168 at this time. As the system is operated at high vacuum with the high vacuum sump valve 56A open to permit the high vacuum to be applied to the sump of the double tank system "A", the liquid from this sump is removed via the line 52, valve 56A and line 114 and may be trapped out in any suitable liquid trap, of which many are well known in the art.

From this trapping location, the liquid may be sampled to determine whether it is a hydrocarbon liquid leaking through the interior tank 18 into the interstices between the two tanks, whether it is ground water which has leaked into the interstices as a result of a leak in the outside tank, or whether it is possibly from some other source. The effect of applying the high vacuum to remove the sump liquid at this time, while purging the system by air entering the interstices via the line 117, solenoid valve 58A and line 62, is to withdraw the liquid and to concurrently sweep out the interstices with clean, drying air so as to dry up any moisture accumulated on the facing walls of the internal and external tanks at this time.

It should be pointed out that to undertake to directly increase the vacuum in the interstices of one of the tank systems by using the main vacuum line connected to the interstices in the manner hereinbefore described at a time when the system is in the high pressure mode would not withdraw fluid which had drained into, and filled the sump at the bottom of the tank being tested. The vacuum would merely increase, and any fluid located in the sump would lock in the sump line. The only effect, whether there was fluid in the sump or not, would be to increase the vacuum in the interstices. In order to withdraw fluid which has accumulated in the sump, air has to enter the system via one of the air vent conduits, such as the line 117, in order to permit liquid to be withdrawn from the sump.

Thus, if any fluid is present, at the time of the high vacuum testing, it will be withdrawn through the respective sump line for each tank system, as each tank system is individually tested, and such withdrawn fluid will be followed by air admitted to that respective tank through the one of the respective solenoid valves which is open to the atmosphere. Of course, if there is no fluid in the sump at this time, only air will be withdrawn from the interstices of the tank under test.

Whether liquid be withdrawn from the sump at the time the high vacuum is applied to the sump via the line 117 connected to the system "A", or whether air is merely withdrawn at this time, it is possible that the vacuum may not build up to that level previously determined to be characteristic of the system when there are no significant leaks in either tank wall. This failure to achieve that expected vacuum will indicate that a higher volume of air is flowing into the interstices than would be permitted to enter through the atmospheric vent valve alone, and therefore further testing may be called for at this point.

To subject the tank "A" to a more intensive high vacuum test, as may be suggested as needed by the less than optimum vacuum status described, the running of the vacuum pump 130 is continued, but the valve 64 is closed so that no air from the atmosphere can enter the interstices between the two tanks in the tank system "A". As the vacuum pump 130 continues to run, the vacuum in this space will continue to increase to a point where, if there are no leaks, it attains a high magnitude vacuum previously determined by calibration to be characteristic of the high integrity, non-leak system.

On the other hand, when the valve 64 is closed with valve 210 in the "A" position, and switch 208 in the "purge" position, if the vacuum does not reach this pre-calibrated level, and continues to remain less than this level, as indicated by the high vacuum gauge 166, this is clearly indicative that a leak exists in one of the tank walls, and is admitting air to the interstices. This ingress of air prevents the development of maximum vacuum in that space. It is also desirable, in imposing the high vacuum test on tank system "A" (or either of the other tank systems "B" or "C" in sequence) to pull the vacuum down to the greatest vacuum possible, and then close the system off by turning the switch 208 on the switch panel to the "OFF" position, and closing valves 142 and 144. The system is now closed in so that the vacuum which has been pulled in the interstices of the tank system "A" (or any other being tested) should fall very slowly if there are no leaks in either the inner tank or the outer tank. By contrast, when the vacuum dissipates more rapidly than expected on the basis of previous successful testing and calibrating there is a possibility that a leak has developed above the fluid level in the tank.

The described process for individually testing for rapid loss of vacuum, as indicated to occur by the reading on the high vacuum gauge 166 is then repeated for each of the other tank systems "B" and "C".

The method which has been described for testing tank system "A" is used in an identical fashion to individually test the tank systems "B" and "C" at a high vacuum during the test mode of operation of the system. This high vacuum testing of the tanks should be carried out periodically, such as once each quarter, with the continuous monitoring of the low vacuum maintained in the interstices being carried out during the intervening periods of time.

At a time when the higher vacuum testing is completed and it is desired to return the system to the low vacuum "AUTOMATIC" monitoring mode, the switch 212 is shifted to the "BLEED" position in which the pointer of this switch points toward the "BLEED" position on the left of the switch. This will cause the solenoid valve 144 to be opened to permit air to enter the system from the atmosphere, and thus allow the system to bleed down to near atmospheric pressure. A decrease of vacuum in the system to 4 inches of Hg or less is necessary before opening the safety valve 168 which places the evacuated system in communication with the sensitive low pressure gauges 172 and 181.

When the vacuum in the system has decreased to 4 inches Hg or less, switch 212 is returned to the "AUTOMATIC" position by moving the switch indicator to the left as shown in FIG. 1, and the switch 210 is turned to the "OFF" position. Switch 208 may be safely turned to the "AUTOMATIC" position, the far left position on switch 208 in FIG. 1, to open the safety valve 168, since low pressure has now been restored throughout the system.

From the foregoing description of the invention, it will be perceived that the two-stage vacuum system of the invention permits continuous monitoring of the tank interstices in a relatively economical fashion, since the vacuum pump is only periodically energized, and then only for a relatively short duration. In the testing mode, the testing can be carried out on each individual tank to remove liquid from the sump, and to remove vapors and condensate from the interstices by purging with atmospheric air.

The system is characterized as having a long and trouble-free operating life, because all of the sensitive gauges reading the vacuum status in the interstices during the low vacuum monitoring mode of operation of the system are protected at a time when the system is shifted to the high vacuum phase.

An operator is quickly apprised of any serious problem which may occur at the time that the system is on the continuously monitoring mode of operation using low vacuum, since any accelerated reduction in the vacuum existing in the interstices will be indicated audibly and visually by the bell 224 and the warning light 222 and/or counter 220. Vacuum tank 154 assures that a vacuum reserve is continuously maintained, so that total loss of vacuum will not occur instantaneously, or even extremely rapidly, if some leak develops in one of the lines or fittings of the system to allow the system to be open to the atmosphere.

In sum, the two-stage vacuum system of the invention can be used to monitor vacuum development and maintenance as a positive method to maintain and verify continuous tank-tightness of both the external single-walled tank, and the internal flexible bladder placed within the external single-walled tank. It can also monitor the fluid-tight integrity of an internal tank which is made of steel or other rigid material. Product release or leakage from the flexible bladder interrupts vacuum flow or development and is detected immediately. Any liquid product which is released is safely contained within the external tank. A breach or failure in the external single-walled Fiberglas ® or steel storage tank also causes a disruption of vacuum development and maintenance, and is detected immediately.

Although a preferred embodiment of the invention has been herein described in order to provide to those skilled in the art, an exposition of the use of the principles upon which the invention is bottomed, it will be understood that various changes and innovations can be made in the illustrated preferred embodiment without departure from the basic principles which underlie the invention. Changes of this sort are therefore deemed to be circumscribed by the spirit and scope of the invention, except as the same may be necessarily limited by the appended claims, or reasonable equivalents thereof.

What is claimed is:

1. A two-stage vacuum system for continuously monitoring and maintaining a vacuum in an evacuated space, and periodically testing structural elements defining such space for fluid tight integrity comprising:
   a sump for trapping and retaining liquid gravitating downwardly within said space;
   a source of vacuum;
   first conduit means connecting said source of vacuum to said space at a location above said sump;
   low level vacuum gauge means for gauging the magnitude of a relatively low level of vacuum in said space over a relatively narrow range of vacuum variation;
   vacuum source actuating means electrically connected to said low level vacuum gauge means and to said source of vacuum for actuating said source of vacuum when said gauge means gauges the magnitude of vacuum in said space as being at the low vacuum end of said narrow range, and for deactivating said source of vacuum when said gauge means gauges the magnitude of vacuum in said space as being at the high vacuum end of said range;

timing means electrically connected to said vacuum source for comparing the time interval over which said vacuum source is actuated with a predetermined time interval constituting the time interval said vacuum source must be actuated to restore vacuum to the high end of said range when loss of vacuum in said space occurs at an acceptable rate due solely to inherent system sources of normal and acceptable fluid leakage into said space;

alarm means electrically connected to said timing means for developing a sensible signal when said timing means indicates that the time interval said vacuum source is actuated has exceeded said predetermined time interval;

second conduit means between said source of vacuum and said sump;

means for placing said vacuum source in vacuum-developing communication with said sump to draw liquid from said sump into said second conduit means as said vacuum source is actuated over an extended period of time to develop a high vacuum;

an electrical circuit including solenoid valve means for actuating said vacuum source over an extended period of time to develop a relatively high vacuum, and for concurrently actuating said means for placing said vacuum source in vacuum-developing communication with said sump, and for concurrently opening said space to the admission of atmospheric air into said space at a rate low enough to allow the vacuum in said space to be built up by the running of said vacuum source over an extended period of time; and means for isolating said low level vacuum gauge means from said space and from said vacuum source when said vacuum source is actuated over an extended period to develop a relatively high vacuum and said vacuum source is in vacuum-developing communication with said sump.

2. A two-stage vacuum system as defined in claim 1 and further characterized as including mean for isolating and collecting at least a part of the liquid drawn into said second conduit means from said sump.

3. A two-stage vacuum system as defined in claim 1 wherein said vacuum source actuating means comprises:
a compressor connected to said source of vacuum; and
means connected between said compressor and said source of vacuum for controlling the flow of compressed air from the compressor to said source of vacuum.

4. A two-stage vacuum system as defined in claim 1 and further characterized as including a counter connected to said vacuum source actuating means for counting the number of times said source of vacuum is actuated, and thus enabling an operator to determine whether such number of times is of a magnitude within a given time period so as to indicate an unacceptably high rate of passage of fluid through one of said structural elements into said space.

5. A two-stage vacuum system as defined in claim 1 wherein said means for isolating said low level vacuum gauge means from said space and from said vacuum source comprises a solenoid safety valve connected in said electrical circuit.

6. A two-stage vacuum system as defined in claim 5 and further characterized as including high level vacuum gauge means for gauging the magnitude of the high vacuum developed by the running of the vacuum source over an extended period of time.

7. A two-stage vacuum system as defined in claim 6 and further characterized a including a counter connected to said vacuum source actuating means for counting the number of times said source of vacuum is actuated, and thus enabling an operator to determine whether such number of times is of a magnitude within a given time period so as to indicate an unacceptably high rate of passage of fluid through one of said structural elements into said space.

8. A two-stage vacuum system as defined in claim 1 and further characterized as including a vacuum storage tank connected in said first conduit means and in said second conduit means between said source of vacuum and said space, and between said source of vacuum and said sump.

9. A two-stage vacuum system as defined in claim 1 and further characterized as including atmospheric air venting solenoid valve means for venting said space to atmospheric pressure at a time when said source of vacuum is de-actuated.

10. A two-stage vacuum system as defined in claim 9 and further characterized as including high level vacuum gauge means for gauging the magnitude of the high vacuum developed by the running of the vacuum source over an extended period of time.

11. A two-stage vacuum system for continuously monitoring and maintaining a vacuum in an evacuated space, and periodically testing structural elements defining said space for liquid tight integrity comprising:
a sump for collecting liquid gravitating downwardly within said space;
a source of vacuum;
low level vacuum gauge means for gauging the magnitude of a relatively low level of vacuum in said space over a range of vacuum variation;
vacuum source actuating means electrically connected to said low level vacuum gauge means for actuating said source of vacuum when said gauge means gauges the magnitude of vacuum in said space as being at the low vacuum end of said range, and for deactivating said source of vacuum when said gauge means gauge the magnitude of vacuum in said space as being at the high vacuum end of said range;
means responsive to the fluctuation of vacuum in said space for developing a signal sensible to the operator of the system when said fluctuation is such that a leak in one of said defining structural elements is indicated;
conduit means between said source of vacuum and said sump and said space;
means for placing said vacuum source in vacuum-developing communication with said sump to draw fluid from said sump into said conduit means as said vacuum source is actuated over an extended period of time to develop a high vacuum; and
an electrical circuit including solenoid valve means for actuating said vacuum source over an extended period of time to develop a high vacuum, and for concurrently actuating said means for placing said vacuum source in vacuum-developing communication with said sump, and for concurrently opening said space to the admission of atmospheric air into said space at a rate low enough to allow said high vacuum to be developed by the continued running of said vacuum source.

12. A two-stage vacuum system as defined in claim 11 and further characterized as including means for isolating said low level vacuum gauge means from said space and from said vacuum source when said vacuum source is actuated over an extended period to develop a high vacuum 13. A two-stage vacuum system as defined in claim 11 and further characterized as including high level vacuum gauge means for gauging the magnitude of the high vacuum developed by the running of said vacuum source over an extended period of time and for indicating the changes in the level of said high vacuum with time, thereby providing an indication of leakage through said defining structural elements.

14. A two-stage vacuum system as defined in claim 11 wherein said means responsive to vacuum fluctuations comprises a counter connected to one of said source of vacuum and said vacuum source actuating means for counting the number of times said source of vacuum is actuated, and thereby whether such counted number is of a magnitude in a given time period such as to indicate an unacceptably fast rate of passage of fluid through one of said structural elements into said space.

15. A two-stage vacuum system as defined in claim 11 wherein said means responsive to said vacuum variations comprises a timing device responsive to the rate at which said source of vacuum can increase the vacuum in said space.

16. A two-stage vacuum system as defined in claim 11 and further characterized as including a vacuum storage tank connected in said conduit means between said source of vacuum and said space, and between said source of vacuum and said sump.

* * * * *